United States Patent
Viswanathan (10) Patent No.: US 11,194,847 B2
(45) Date of Patent: Dec. 7, 2021

(54) METHOD, APPARATUS, AND COMPUTER PROGRAM PRODUCT FOR BUILDING A HIGH DEFINITION MAP FROM CROWD SOURCED DATA

(71) Applicant: HERE Global B.V., Eindhoven (NL)

(72) Inventor: Anirudh Viswanathan, Berkeley, CA (US)

(73) Assignee: HERE GLOBAL B.V., Eindhoven (NL)

(*) Notice: Subject to any disclaimer, the term of this patent is extended or adjusted under 35 U.S.C. 154(b) by 536 days.

(21) Appl. No.: 16/229,364

(22) Filed: Dec. 21, 2018

(65) Prior Publication Data

US 2020/0201890 A1 Jun. 25, 2020

(51) Int. Cl.
| | | |
|---|---|---|
| G06F 17/18 | (2006.01) | |
| G01C 21/32 | (2006.01) | |
| G05D 1/00 | (2006.01) | |
| G05D 1/02 | (2020.01) | |
| G06K 9/00 | (2006.01) | |
| G06F 16/29 | (2019.01) | |

(52) U.S. Cl.
CPC .......... G06F 16/29 (2019.01); G01C 21/32 (2013.01); G05D 1/0088 (2013.01); G05D 1/0274 (2013.01); G06F 17/18 (2013.01); G06K 9/00798 (2013.01); G05D 2201/0213 (2013.01)

(58) Field of Classification Search
CPC ...... G01C 21/30; G01C 21/32; G05D 1/0088; G05D 2201/0213; G06F 16/29; G06F 17/18; G06K 9/00791; G06K 9/00798
See application file for complete search history.

(56) References Cited

U.S. PATENT DOCUMENTS

| | | |
|---|---|---|
| 9,710,730 B2 | 7/2017 | Konukoglu et al. |
| 9,760,099 B2 | 9/2017 | Chen et al. |
| 2017/0278402 A1* | 9/2017 | Yalla .................. G01C 21/3602 |

(Continued)

OTHER PUBLICATIONS

Nuchter, A. et al., *3D Mapping with Semantic Knowledge* [online] [retrieved Feb. 7, 2019]. Retrieved via the Internet: <URL: https://pdfs.semanticscholar.org/08ba/da6c84a5124784369d4113ef5a86705e92ad.pdf>. (dated 2005) 12 pages.

(Continued)

*Primary Examiner* — Peter D Nolan
*Assistant Examiner* — Ce Li Li
(74) *Attorney, Agent, or Firm* — Alston & Bird LLP (57) ABSTRACT

A method, apparatus and computer program product are provided for constructing a high definition map from crowd sourced data using semantic attributes to bootstrap map construction. Methods may include: receiving first sensor data from a first vehicle having traversed a first path along a first lane of a first road segment; identifying features from the first sensor data of the first road segment; receiving second sensor data from a second vehicle having traversed a second path along a second lane of the first road segment; identifying features from the second sensor data of the first road segment; aligning the identified features from the second sensor data with the identified features from the first sensor data of the first road segment; and combining the identified features from the first sensor data and the second sensor data based, at least in part, on the confidence of the respective sensor data.

20 Claims, 7 Drawing Sheets

(56) References Cited

U.S. PATENT DOCUMENTS

2018/0188059 A1* 7/2018 Wheeler ............ G01C 21/3635
2019/0025071 A1* 1/2019 Fukui ..................... G09B 29/10

OTHER PUBLICATIONS

Yang, B. et al., *Automatic Registration of Large-Scale Urban Scene Point Clouds Based on Semantic Feature Points*, ISPRS Journal of Photogrammetry and Remote Sensing, 113 (2016) 43-58.

Yu, F. et al., *Semantic Alignment of LIDAR Data at City Scale* [online] [retrieved Feb. 7, 2019]. Retrieved via the Internet: <URL: https://www.cs.princeton.edu/~funk/cvpr15.pdf>. (dated Jun. 2015) 10 pages.

* cited by examiner

METHOD, APPARATUS, AND COMPUTER PROGRAM PRODUCT FOR BUILDING A HIGH DEFINITION MAP FROM CROWD SOURCED DATA

TECHNOLOGICAL FIELD

An example embodiment relates generally to the crowd sourcing map data and, more particularly, to constructing a high definition map from crowd sourced data using semantic attributes to bootstrap map construction.

BACKGROUND

Probe points are frequently captured by global positioning systems ("GPS"), navigation systems or the like. Each probe point is associated with a location, such as may be expressed in terms of latitude and longitude. Some probe points are also associated with a heading and a speed at which the GPS system or the navigation system was moving at the time at which the probe point was captured. Vehicles are increasingly being equipped with varying degrees of sensors which may provide data relating to various aspects of the environment of a vehicle as it travels along a road. This data may be invaluable in determining features of a road.

The probe data from vehicles traveling along the road segments may be used to inform map updates of road changes (e.g., properties of the road segment or a path of the road segment) and may inform traffic levels along the road segment. However, due to the variability of probe data, this crowd sourced data may generally be used to update map data when the map data is initially created from known-true data.

BRIEF SUMMARY

A method, apparatus and computer program product are provided in accordance with an example embodiment in order to construct a high definition map from crowd sourced data using semantic attributes to bootstrap map construction. Embodiments described herein may provide an apparatus including at least one processor and at least one non-transitory memory including program code instructions. The computer program code instructions may be configured to, when executed, cause the apparatus to: receive first sensor data from a first vehicle having traversed a first path along a first lane of a first road segment; identify features from the first sensor data of the first road segment, where a confidence of the first sensor data is inversely proportional to a distance of the data from the first path; receive second sensor data from a second vehicle having traversed a second path along a second lane of the first road segment; identify features from the second sensor data of the first road segment, where a confidence of the second sensor data is inversely proportional to a distance from the second path; align the identified features from the second sensor data of the first road segment with the identified features from the first sensor data of the first road segment; combine the identified features from the first sensor data and the second sensor data based, at least in part, on the confidence of the respective sensor data; and generate a map of the road segment based on the combined identified features.

The apparatus of some embodiments may be caused to facilitate autonomous vehicle control along the road segment based, at least in part, on the generated map of the road segment. The features of the first sensor may be classified into at least one of a plurality of attribution categories, where the features of the second sensor data may be classified into at least one of the plurality of attribution categories. Causing the apparatus to align the identified features from the second sensor data with the identified features from the first sensor data may include causing the apparatus to align identified features of a first attribution category of the second sensor data with identified features of the first attribution category of the second sensor data. The confidence of the first sensor data may be further defined by one or more properties of a sensor producing the first sensor data. The apparatus of some embodiments may be caused to refine the combined identified features from the first sensor data and the second sensor data using a maximum likelihood estimator. Missing data from the combined identified features from the first sensor data and the second sensor data may be replaced with data interpreted in context of the first sensor data and the second sensor data. The maximum likelihood estimator may determine a location of the combined identified features.

Embodiments provided herein may include a computer program product having at least one non-transitory computer-readable storage medium having computer-executable program code portions stored therein. The computer-executable program code portions may include program code instructions to: receive first sensor data from a first vehicle having traversed a first path along a first lane of a first road segment; identify features from the first sensor data of the first road segment, where a confidence of the first sensor data is inversely proportional to a distance from the first path; receive second sensor data from a second vehicle having traversed a second path along a second lane of the first road segment; identify features from the second sensor data of the first road segment, where a confidence of the second sensor data is inversely proportional to a distance from the second path; align the identified features from the second sensor data of the first road segment with the identified features from the first sensor data of the first road segment; combine the identified features from the first sensor data and the second sensor data based, at least in part, on the confidence of the respective sensor data.; and generate a map of the road segment based on the combined identified features.

According to some embodiments, the computer program product may include program code instructions to facilitate autonomous vehicle control along the road segment based, at least in part, on the generated map of the road segment. The features of the first sensor data may be classified into at least one of a plurality of attribution categories, where the features of the second sensor may be classified into at least one of the plurality of attribution categories. The program code instructions to align the identified features from the second sensor data with the identified features from the first sensor data may include program code instructions to align identified features of the second sensor data of a first attribution category with identified features of the first sensor data of the first attribution category. The confidence of the first sensor data may be further defined by one or more properties of a sensor producing the first sensor data. The computer program product may include program code instructions to refine the combined identified features from the first sensor data and the second sensor data using a maximum likelihood estimator. Missing data from the combined identified features from the first sensor data and the second sensor data may be replaced with data interpreted in context of the first sensor data and the second sensor data. The maximum likelihood estimator may determine a location of the combined identified features.

Embodiments described herein may provide a method including: receiving first sensor data from a first vehicle having traversed a first path along a first lane of a first road segment; identifying features from the first sensor data of the first road segment, where a confidence of the first sensor data is inversely proportional to a distance from the first path; receiving second sensor data from a second vehicle having traversed a second path along a second lane of the first road segment; identifying features from the second sensor data of the first road segment, where a confidence of the second sensor data may be inversely proportional to a distance from the second path; aligning the identified features from the second sensor data of the first road segment with the identified features from the first sensor data of the first road segment; combining the identified features from the first sensor data and the second sensor data based, at least in part, on the confidence of the respective sensor data; and generating a map of the road segment based on the combined identified features.

According to some embodiments, methods may include facilitating autonomous vehicle control along the road segment based, at least in part, on the generated map of the road segment. The features of the first sensor data may be classified into at least one of a plurality of attribution categories, where the features of the second sensor data are classified into at least one of the plurality of attribution categories. Aligning the identified features from the second sensor data with the identified features from the first sensor data may include aligning identified features of the second sensor data of a first attribution category with identified features of the first sensor data of the first attribution category. The confidence of the first sensor data may be further defined by one or more properties of a sensor producing the first sensor data. Methods may include refining the combined identified features from the first sensor data and the second sensor data using a maximum likelihood estimator. The maximum likelihood estimator may determine a location of the combined identified features.

Embodiments described herein may provide an apparatus including: means for receiving first sensor data from a first vehicle having traversed a first path along a first lane of a first road segment; means for identifying features from the first sensor data of the first road segment, where a confidence of the first sensor data is inversely proportional to a distance from the first path; means for receiving second sensor data from a second vehicle having traversed a second path along a second lane of the first road segment; means for identifying features from the second sensor data of the first road segment, where a confidence of the second sensor data may be inversely proportional to a distance from the second path; means for aligning the identified features from the second sensor data of the first road segment with the identified features from the first sensor data of the first road segment; means for combining the identified features from the first sensor data and the second sensor data based, at least in part, on the confidence of the respective sensor data; and means for generating a map of the road segment based on the combined identified features.

According to some embodiments, an apparatus may include means for facilitating autonomous vehicle control along the road segment based, at least in part, on the generated map of the road segment. The features of the first sensor data may be classified into at least one of a plurality of attribution categories, where the features of the second sensor data are classified into at least one of the plurality of attribution categories. The means for aligning the identified features from the second sensor data with the identified features from the first sensor data may include means for aligning identified features of the second sensor data of a first attribution category with identified features of the first sensor data of the first attribution category. The confidence of the first sensor data may be further defined by one or more properties of a sensor producing the first sensor data. An example apparatus may include means for refining the combined identified features from the first sensor data and the second sensor data using a maximum likelihood estimator. The maximum likelihood estimator may determine a location of the combined identified features.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to use crowd sourced probe data to construct a high definition map, and more particularly, to use semantic attributes of crowd sourced probe data to bootstrap the map construction. Vehicles equipped with sensors may drive along a road segment and produce probe data indicative of the road segment and properties/features thereof. Depending upon the capabilities of the sensors of the vehicle, data may include a path of the roadway, a travel speed along the roadway, imagery identifying lane lines or signage along the roadway such as speed limits, stop signs, etc., distance sensors such as Light Imaging, Detection, and Ranging (LIDAR) may provide locations and sizes of objects along a roadway, etc. In order to have sufficient coverage of geographic regions, road segments may require a plurality of probes to travel along a road segment to provide reliable data relating to the road segment. For example, due to inaccuracies in locationing mechanisms such as global positioning systems (GPS), the location identified by a vehicle probe along a road segment may actually be a location off of the road segment by several meters. Increasing the number of data points gathered by vehicle probes along a road segment mitigates errors in sensors such as GPS to achieve a more reliable crowd-sourced representation of the road segment and the data collected thereon.

Figure 1:
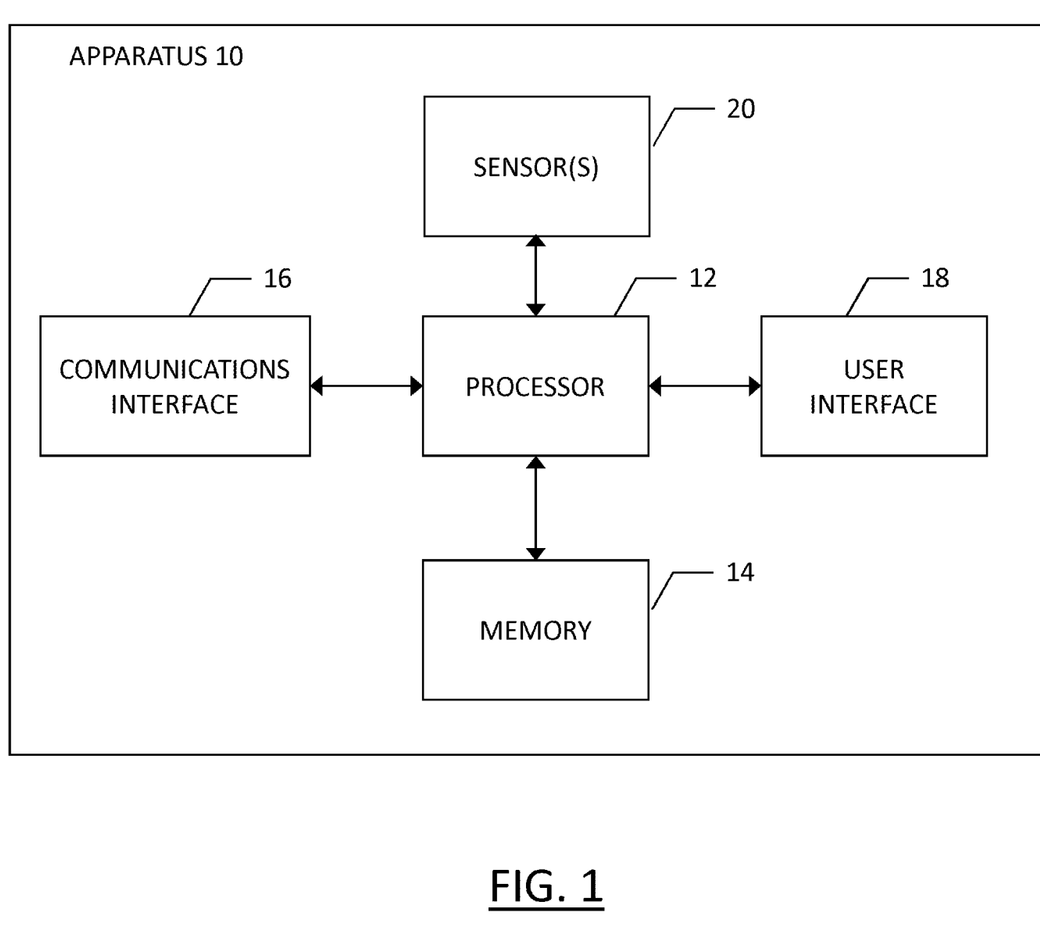
FIG. 1 is a block diagram of an apparatus according to an example embodiment of the present disclosure.

Embodiments described herein may use an apparatus to collect and send probe data to a map services provider which may, in turn, build and update map data according to the collected data. The apparatus may optionally benefit from the collection and providing of probe data to the map services provider as the apparatus of example embodiments may provide route guidance to a user and/or may facilitate autonomous or semi-autonomous vehicle control. The apparatus of an example embodiment may be embodied by a variety of computing devices including, for example, a navigation system, an advanced driver assistance system (ADAS), a GPS system or the like. Additionally or alternatively, the apparatus may be embodied in other types of computing devices, particularly when crowd-sourced probe data is used for map building by a map services provider, which may be embodied by a server, a computer workstation, a plurality of networked computing devices or the like, that are configured to communicate with or function as the map services provider as described herein. In this regard, FIG. 1 depicts the apparatus 10 of an example embodiment that may be embodied by various computing devices including those identified above. As shown, the apparatus of an example embodiment may include, may be associated with or may otherwise be in communication with a processor 12 and a memory device 14 and optionally a communication interface 16, one or more sensors 20, and/or a user interface 18.

In some embodiments, the processor 12 (and/or co-processors or any other processing circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 may be equipped with any number of sensors 20, such as a global positioning system (GPS) sensor/antenna, accelerometer, image sensor, LiDAR (Light Distancing and Ranging) sensor, radar, and/or gyroscopic sensor. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 10, such as by near field communication (NFC) including, but not limited to, Bluetooth™ communication, or the like.

The apparatus 10 of an example embodiment also optionally includes a communication interface 16 that may be any means such as a device or circuitry embodied in either hardware or a combination of hardware and software that is configured to receive and/or transmit data from/to other electronic devices in communication with the apparatus, such as by being configured to receive probe data from a sensor or plurality of sensors, and provide said probe data to a database, cloud storage or other external memory device associated with the map services provider. The communication interface may be configured to transmit and/or receive data, such as to or from a map services provider. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated in FIG. 1, the apparatus 10 may optionally include or otherwise be in communication with a user interface 18. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms. The user interface 18 may include, for example, a display to provide navigational assistance or route guidance to a user based on data received from the map services provider. The processor and/or user interface circuitry comprising the processor may be configured to control one or more functions of one or more input/output mechanisms through computer program instructions (for example, software and/or firmware) stored on a memory accessible to the processor (for example, memory device 14 and/or the like).

The apparatus 10 may support a mapping or navigation application so as to present maps or otherwise provide navigation or driver assistance. In order to support a mapping application, the computing device may include or otherwise be in communication with a geographic database, such as may be stored in memory 14. For example, the geographic database includes node data records, road segment or link data records, point of interest (POI) data records, and other data records. More, fewer or different data records can be provided. In one embodiment, the other data records include cartographic data records, routing data, and maneuver data. In order to fully utilize map data within the map database, accurate map-matching of probe data points to locations on the map, such as road segments or links, is necessary.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle through map-matching techniques described herein. Semi-autonomous vehicle control may be any level of driver assistance from adaptive cruise control, to lane-keep assist, or the like.

Figure 2:
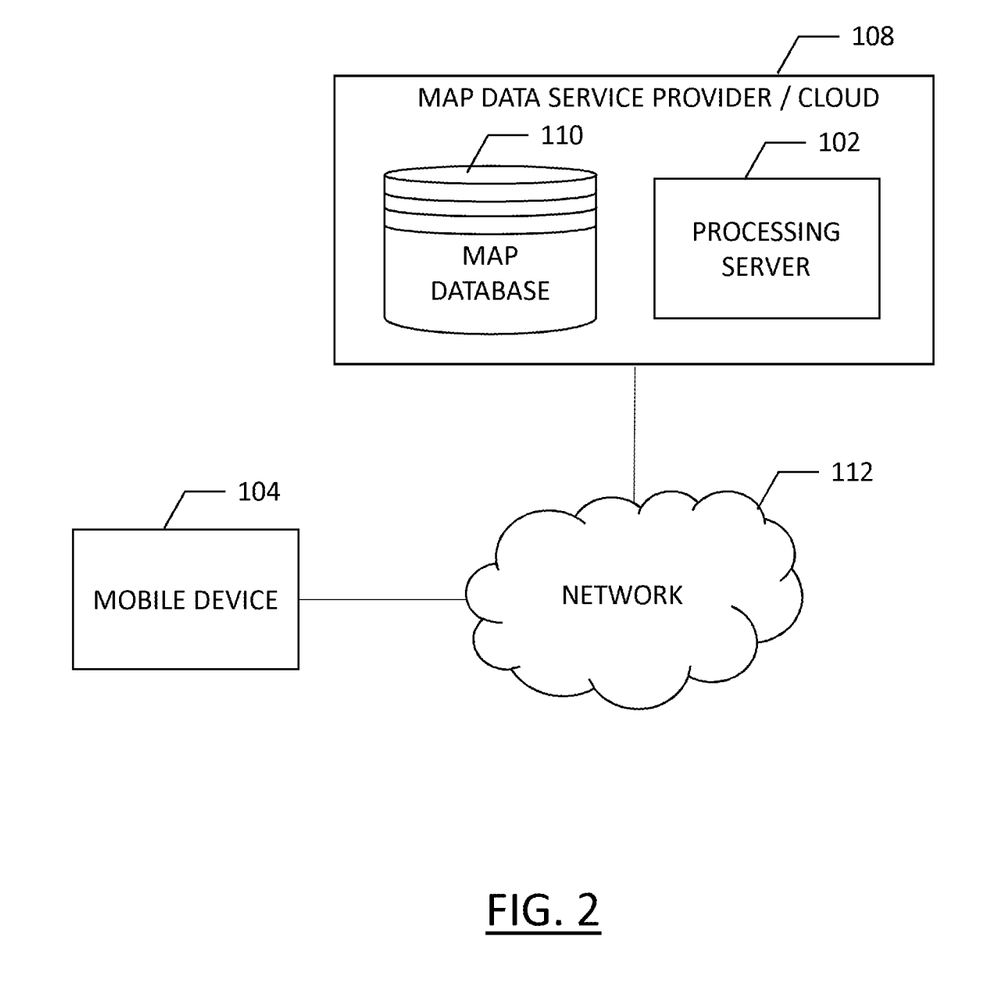
FIG. 2 is a block diagram of a system for constructing a high definition map from crowd sourced data using semantic attributes to bootstrap map construction according to an example embodiment of the present disclosure.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 10 of FIG. 1, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them using vehicles and specifically configured sensor arrays with a high degree of accuracy, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region, as described further below.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a physical storage format (PSF)) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can include the apparatus 20 of FIG. 1 and can be embodied by an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

In order for the map database 110 to be effective, the map database should include as much detail regarding all road segments within a network of roads in order to provide the most accurate and efficient routing of vehicles through the network of roads. However, issues exist with gathering probe data relating to road segments, particularly those less traveled. Generating reliable data related to a road segment may be challenging when a road segment is not traversed by a specially-equipped vehicle specifically configured for map data generation and updating. Such vehicles may be employed by map data service providers; however, these vehicles cannot reasonably traverse every road segment of a region, particularly in view of changes to roadways that occur over time.

Advances in vehicle technology are resulting in more vehicles on the road with a greater degree of autonomy, which necessitates greater levels of sensor capability. The ubiquity of vehicles traveling along road segments with at least some degree of sensed data provides large volumes of data with respect to the road segments. However, the reliability of the crowd-sourced data may be uncertain, such that potentially unreliable data may be provided by a vehicle for map building and updating at the map data service provider 108. Embodiments described herein mitigate erroneous crowd sourced data through a compilation of various data sources and reliance upon common data among the various data sources. Further, embodiments may reduce the complexity with which data sources are matched with one another for multi-source data collaboration to achieve more accurately mapped data from a plurality of sources.

Map data generation and updating may rely on various sources for data relating to road location, geometry, and features of the roadway. Data may be generated or provided by municipalities, utility companies, transportation departments, map data providers, vehicle manufacturers, navigation system manufacturers, etc. These data sources may be diverse and may provide different levels of detail and varying degrees of accuracy. Data aggregation from heterogeneous data sources is complex since data from different vendors or sources may include different internal data processing algorithms and filtering techniques. Further, data sources may be in different price points that are tied to signal reliability and repeatability.

While map data updates may be aided by crowd-sourced data, the crowd-sourced data is generally used for updating map data that is built through known-reliable data sources. Mapping of new regions or "map building" using crowd sourced data is typically not performed due to the unknown reliability of crowd sourced data from disparate sources which may have sensors of unknown quality or reliability.

Embodiments described herein relate to map building or map construction from crowd sourced data sources, such as data collected from original equipment manufacturers (OEMs), probe data (e.g., data from mobile phone service providers/manufacturers or navigational devices), and from "true" data gathered by specifically configured vehicles that traverse a road network gathering data in a known-reliable high-definition manner. Embodiments may create a new map in a region that has never before been mapped or has undergone significant construction or change since a prior map by collecting data aggregates in the region. The raw-data sources can be from different sensor configurations or different sensor types, such as sensor 20 of FIG. 1, which may include LIDAR sensors or image sensors. Embodiments provide a technique of automated map construction using such data sources collected in a pre-specified region. Further, the data sources are assumed to be noisy, such as in cases where the detector may fail to correctly identify a sign or a lane line, and do not require manual data cleansing operations by a human.

Map building for a previously unmapped region is challenging, particularly when building a high-definition (HD) map that has very high resolution as relevant to the autonomous or semi-autonomous driving use-case, where lane-lines and signs need to be correctly identified and mapped. The current approach to HD map construction is to use high-precision mapping such as a specifically configured, highly accurate vehicle to traverse a road network. The collected data is then sent to a set of human operators who may use a semi-automated method to delineate lanes and signs, and construct the map in a manual, labor-intensive process. While this approach may provide accurate results, the method is expensive and difficult to scale to accommodate vast volumes of data that are available from crowd-sourcing.

Generating a map or map building from crowd sourced data may be ripe for error since noisy data, such as failing detectors, sensor bias, or missing data, may adversely affect the creation of the map data. Using a single data source as a basis for crowd sourced map generation may provide an erroneous basis, whereby map data updates from other crowd sources that may in fact be accurate, are determined to be inaccurate for failing to correspond with the inaccurate map data generated by the single source. Embodiments described herein provide a method of map construction from crowd sourced data that provide an accurate map that may be updated reliably through additional crowd sourced data.

Embodiments of the present disclosure describe map construction from crowd sourced data using semantic attributes to bootstrap the map construction. The stability of the semantic features in an alignment step across disparate data sources, with soft-assignment of the semantic class, provides a stable base-map, which can then be updated as new crowd sourced data is captured in the region and processed.

High definition/HD maps as described herein may include semantic attribute categories for features identified in the images of the map data representing environments of a road segment as a vehicle traverses the road segment. The stored map data may include semantic attribute category identifiers for the features of stored images and potentially for features in a model of the road network. These semantic attribute categories for features may include different sign types (e.g., stop signs, speed limits, etc.) and/or different lane line types (e.g., dashed, short-dashed, solid, yellow, white, etc.) or other features that may commonly exist along a roadway. This semantic attribute categorization allows detected features to only be correlated with map features of the same semantic attribute category, thereby substantially reducing the amount of data that requires comparing, as will be detailed further below. Features of an image may be categorized based on a number of factors. A perception module, which may be used to identify features in an environment, may be embodied by processor 12 of FIG. 1 in an example in which features are identified locally at a vehicle, or embodied by processing server 102 of FIG. 2 in an example in which features are identified by a map data service provider. The perception module may be configured to categorize features detected in an image into the semantic attribute categories. This categorization may be performed through machine learning, which may benefit from training data where features are either manually or automatically identified and categorized, and confirmed by a person to ensure the training data is accurate.

To generate map data including features categorized into semantic attribute categories, sensor data for an environment may be gathered, whether by crowd-sourced sensor-equipped vehicles, or by vehicles employed by map data service providers. Once data is gathered, a perception module may identify features within images of the environment. A user may be presented with the images and feature identification along with feature semantic attribute categories. The user may confirm a predicted semantic attribute category of a feature identified by the perception module, or the user may correct an improper semantic attribute category. Once the image is labeled with features identified according to their semantic attribute categories, the data may become training data to facilitate feature identification and categorization for future map image data in an automated manner.

Embodiments provided herein may build an HD map of a region that was previously unmapped through the gathering of crowd sourced data, and identifying semantic attribute categories of different attributes within the environment using a perception module. When crowd sourcing data, different data sources may have differing sensor capabilities. Different data sources may have different confidence levels of the detected attributes. For instance, in some cases, the ego-lane attribution, or an attribution of the current lane of travel of a sensor equipped vehicle, may be dependable, while other lane features may be less reliable and may have a noisy attribution.

Figure 3:
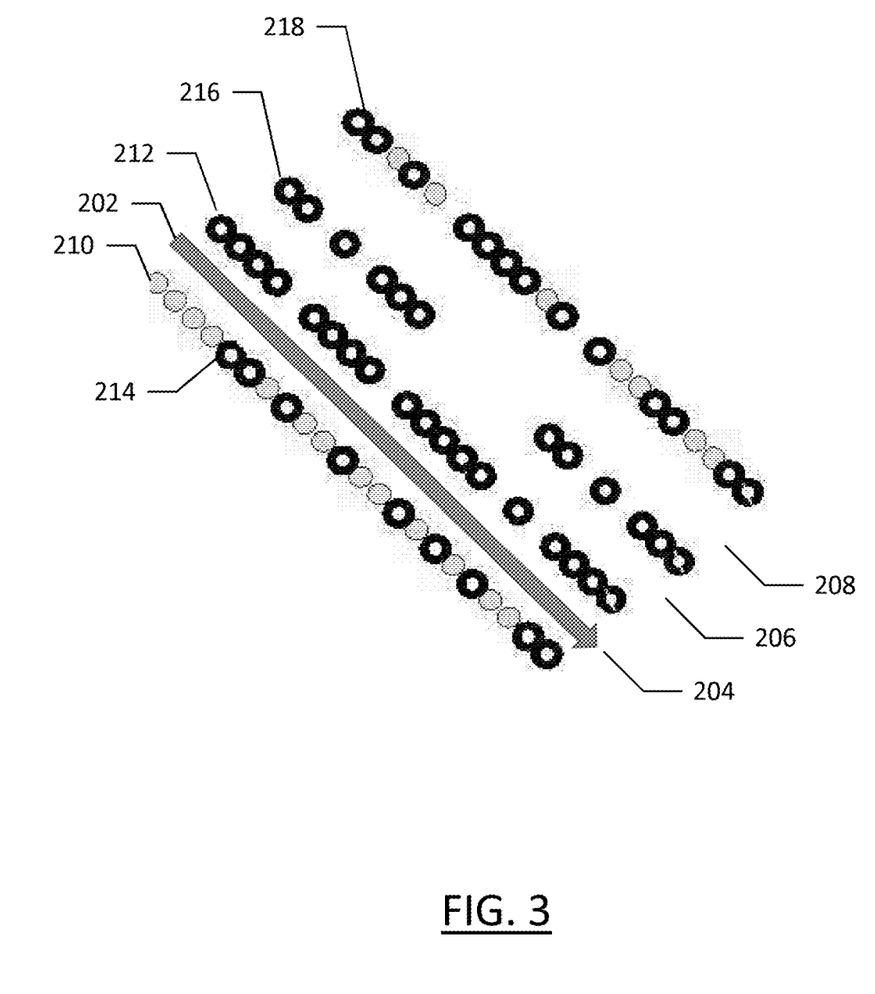
FIG. 3 illustrates sensor data gathered from a first drive along a road segment according to an example embodiment of the present disclosure.

FIG. 3 illustrates an example embodiment in which a sensor-equipped vehicle, such as a vehicle carrying or in communication with apparatus 10, has traveled along a path 202, which is a first lane 204 of a three-lane roadway including lanes 204, 206, and 208. In the illustrated embodiment of FIG. 3, the first lane 204 is the ego-lane as that is the lane in which the vehicle has traveled as illustrated by path arrow 202. As shown, the ego-lane attribution, which is the lane-line adjacent to the ego-lane, includes a relatively robust identification of a solid lane line indicated by circles 210 on the right-side of the vehicle path 202, and a dashed lane line or broken lane line indicated by hollow circles 212 adjacent the ego-lane to the left of the path 202. There are some discontinuities in the solid lane line indicated by hollow circles 214, but for the most part, the solid lane line 210 is identified. Lane lines not adjacent to the ego-lane, such as lane lines having circles 216 and 218 are more sparsely identified with a lower degree of reliability.

In building or constructing map data for a new mapped region, the drive or path 202 may be chosen at random from a plurality of paths along a road segment from crowd sourced data. The random selection may reduce bias introduced by paths selected from similar sources and may provide a more reliable method of map construction. The attributes adjacent to an ego-lane of a sensor equipped vehicle traveling along the road segment may be assumed accurate, while attributes of other lanes may have a lower confidence or degree of certainty. Different data sources may have different confidence levels of detected attributes such that the ego-lane attribution or the identified features of the ego lane may be dependable, while other lanes have a lower degree of confidence. The confidence of lane attribution may be inversely proportional to the distance from the path of the vehicle, such that according to the embodiment of FIG. 3, the confidence of the lane attribution of lane 206 is lower than that of lane 204, while the confidence of the lane attribution of lane 208 is less than that of lane 206. The degree of decline of confidence as the distance from the sensor may be based, at least in part, on a quality of the sensors or sensed data from the vehicle traveling in the ego lane. Sensor quality may be identified by the sensor type, sensor location, sensor capabilities, etc., and may be communicated with the sensor data, such as to map data service provider 108 to inform the map building and construction.

Figure 4:
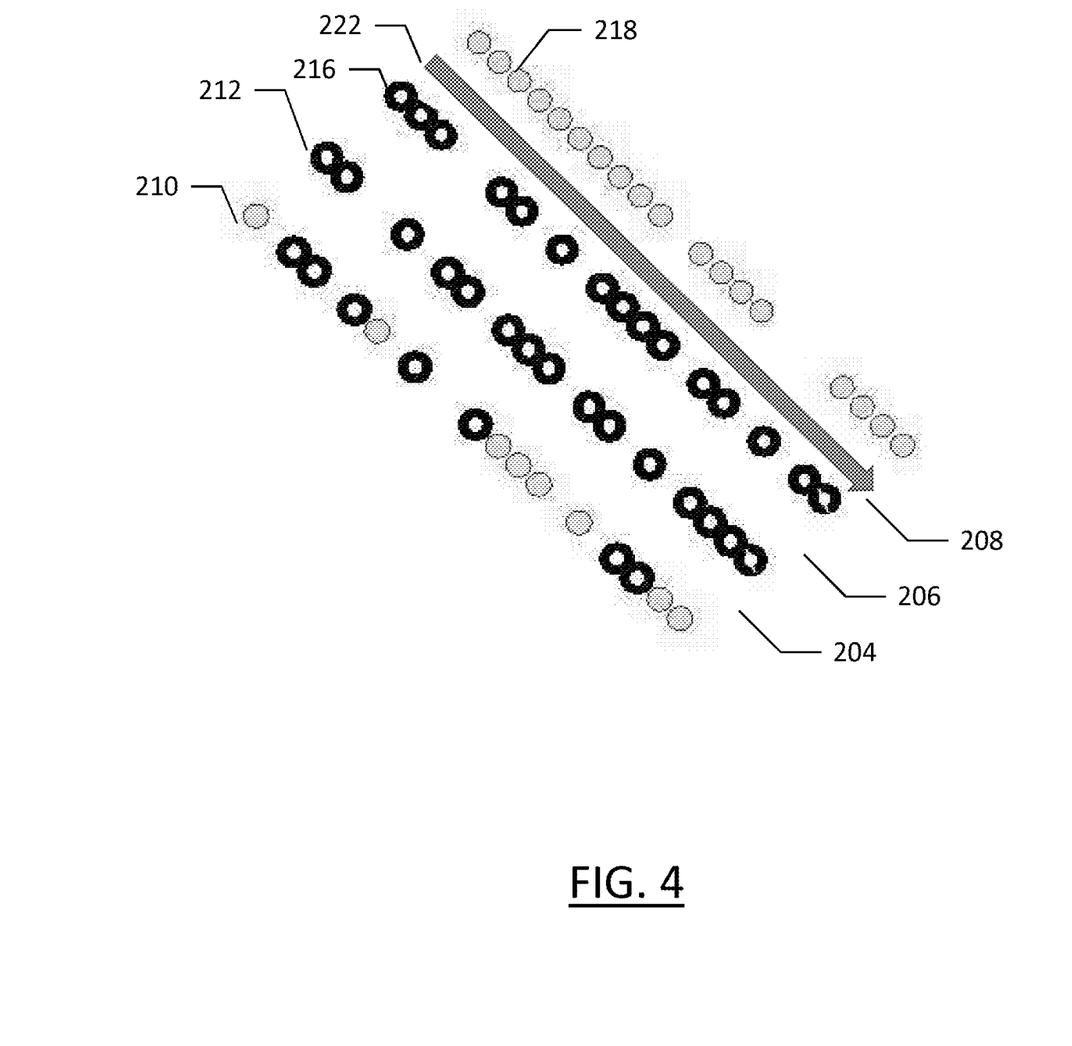
FIG. 4 illustrates sensor data gathered from a second drive along a road segment according to an example embodiment of the present disclosure.

FIG. 4 illustrates the same road segment as illustrated in FIG. 3, with features identified by sensors of another vehicle traveling along path 222, also chosen at random. The features identified by sensors of the vehicle traveling along path 222 may be aligned with the features identified by sensors of the vehicle traveling along path 202. As shown, the vehicle traveling in lane 208 may reliably detect lane attribution of ego-lane 208, while the lane attribution of lanes 206 and 204 may be detected with lower confidence. The lane attributions of ego-lane 208 include a solid lane line identified by solid circles 218 and a broken lane line identified by hollow circles 216, both of which are adjacent to the ego-lane.

Figure 5:
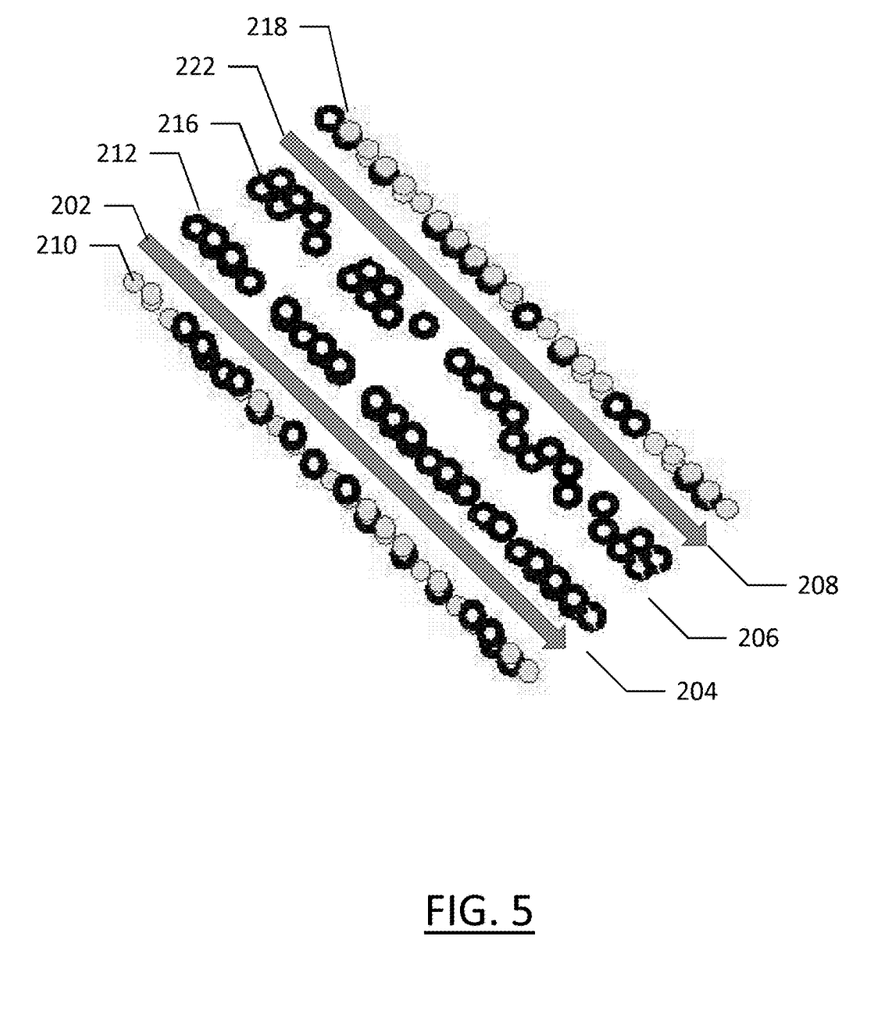
FIG. 5 illustrates the sensor data of the second drive aligned with and overlaid on the sensor data of the first drive according to an example embodiment of the present disclosure.

The data gathered from the drive illustrated by path 212 in FIG. 4 is aligned to the data gathered from the drive illustrated by path 202 in FIG. 3 using only the attribution classifications of the features, so dashed or broken lane lines can only be aligned with dashed lane lines, and solid lane lines can only be aligned with solid lane lines. For the non-ego lane for the drive of FIG. 3, the attribution categories of the second drive of FIG. 4 are used to fill-in the correct attribution and to update an existing probability distribution of attributions of that specific feature. Thus, features or attributions of lanes that are of lower confidence are reinforced and confidence is increased responsive to features from a second drive confirming those features or attributions. FIG. 5 illustrates the data gathered from the drive of FIG. 4 aligned with the data gathered from the drive of FIG. 3. The alignment based on attribution classes reduces, e.g., minimizes, the pairwise distance between points belonging to the same attribution category, thereby enhancing the feature alignment accuracy while also reducing the processing capacity required to perform feature alignment. In this manner, solid lane lines, such as those of lines 210 and 218, would not be aligned to broken/dashed lane lines 212 and 216, and excess processing is not performed.

Figure 6:
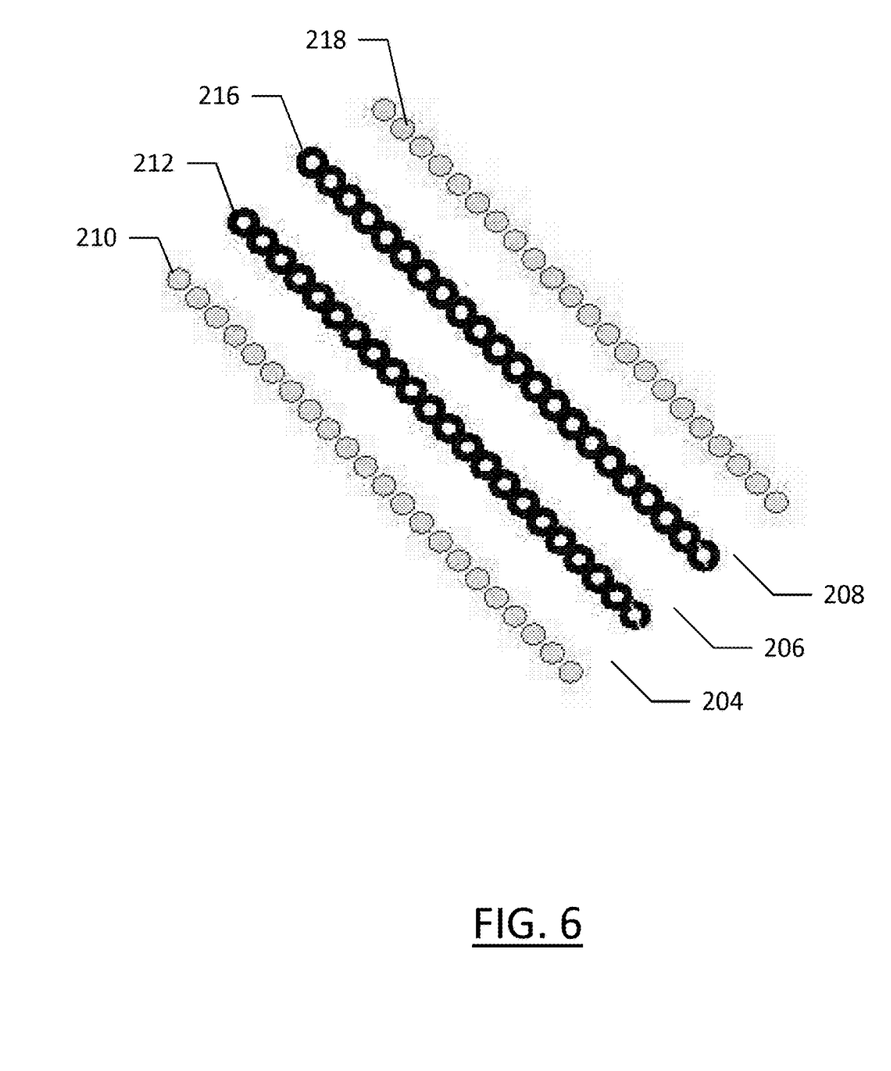
FIG. 6 illustrates a refined combination of the sensor data of the first drive and the sensor data of the second drive refined according to a maximum likelihood estimator and with missing data replaced with interpreted data in context according to an example embodiment of the present disclosure.

FIG. 6 illustrates a final map based on the drives of FIGS. 3 and 4, where the attribution categories are refined using a maximum likelihood estimator, and missing data samples are interpreted in context. The maximum likelihood estimator may be implemented or embodied by processor 12 of FIG. 1 or by processing server 102 of FIG. 2. As shown, the solid lane lines 210 and 218 and the dashed lane lines 212 and 216 are determined with a high degree of certainty, and missing data is interpolated to generate accurate lane lines for lanes 204, 206, and 208. While only two drives are shown in the illustrated embodiment of FIGS. 3 through 6, any number of crowd sourced drives of sensor-equipped vehicles may be used to construct a map using crowd sourced data and to adjust and correct the data as new crowd sourced sensor data is gathered. In this manner, a high definition map may be constructed using crowd sourced data rather than requiring specifically configured vehicles and manual intervention. This provides a method of map construction from crowd sourced data using semantic attributes to bootstrap construction in a manner that is computationally efficient and substantially lower cost than conventional map building techniques.

Figure 7:
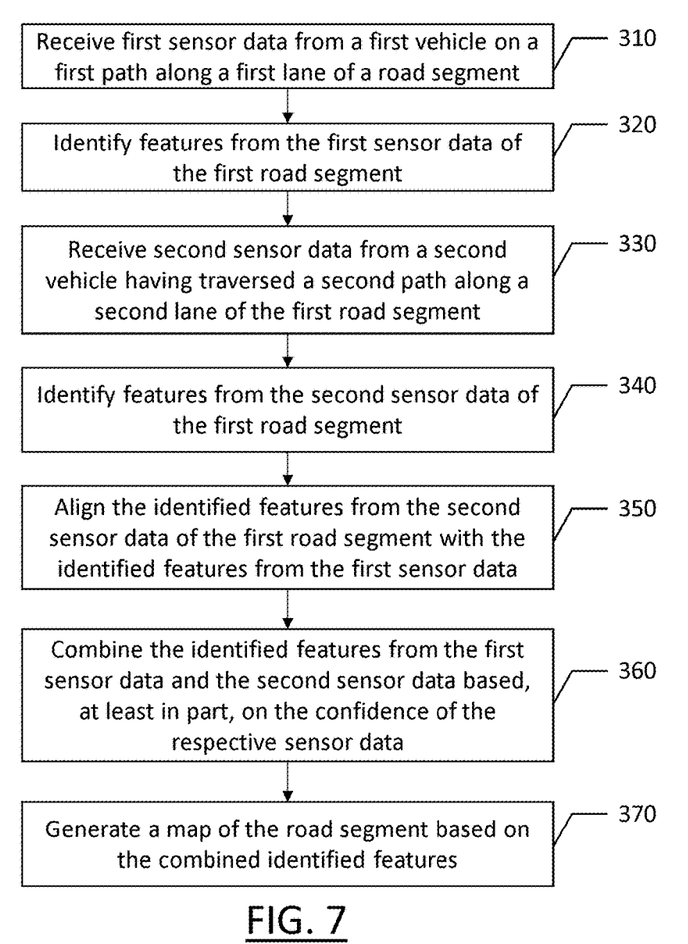
FIG. 7 is a flowchart illustrating the operations performed, such as by the apparatus of FIG. 1, for constructing a high definition map from crowd sourced data using semantic attributes to bootstrap map construction according to an example embodiment of the present disclosure.

FIG. 7 illustrates a flowchart of an apparatus, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by a processor 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

According to the example embodiment of FIG. 7, first sensor data from a first vehicle on a first path along a first lane of a road segment is received at 310. This data may be received, for example, by map data service provider 108. The sensor data may be generated by sensors, such as sensors 20 of the apparatus 10 of FIG. 1. Features from the first sensor data of the first road segment are identified at 320, such as by processing server 102. Second sensor data from a second vehicle having traversed a second path along a second lane of the first road segment is received at 330. Features from the second sensor data of the first road segment are identified at 340. Identified features from the second sensor data of the first road segment are aligned with the identified features from the first sensor data at 350. The identified features from the first sensor data and the second sensor data are combined at 360 based, at least in part, on a confidence of the respective sensor data. At 370, a map of the road segment is generated based on the combined identified features.

In an example embodiment, an apparatus for performing the method of FIG. 7 above may comprise a processor (e.g., the processor 12) configured to perform some or each of the operations (310-370) described above. The processor may, for example, be configured to perform the operations (310-370) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-370 may comprise, for example, the processor 12 and/or a device or circuit for executing instructions or executing an algorithm for processing information as described above.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive first sensor data from a first vehicle having traversed a first path along a first lane of a first road segment;
   identify features from the first sensor data of the first road segment, wherein a confidence of the first sensor data is inversely proportional to a distance from the first path;
   receive second sensor data from a second vehicle having traversed a second path along a second lane of the first road segment;
   identify features from the second sensor data of the first road segment, wherein a confidence of the second sensor data is inversely proportional to a distance from the second path;
   align the identified features from the second sensor data of the first road segment with the identified features from the first sensor data of the first road segment;
   combine the identified features from the first sensor data and the second sensor data based, at least in part, on the confidence of the respective sensor data; and
   generate a map of the road segment based on the combined identified features.

2. The apparatus of claim 1, wherein the apparatus is further caused to:
   facilitate autonomous vehicle control along the road segment based, at least in part, on the generated map of the road segment.

3. The apparatus of claim 1, wherein the features of the first sensor data are classified into at least one of a plurality of attribution categories, wherein the features of the second sensor data are classified into at least one of the plurality of attribution categories, wherein causing the apparatus to align the identified features from the second sensor data with the identified features from the first sensor data comprises causing the apparatus to:
   align identified features of the second sensor data of a first attribution category with identified features of the first sensor data of the first attribution category.

4. The apparatus of claim 1, wherein the confidence of the first sensor data is further defined by one or more properties of a sensor producing the first sensor data.

5. The apparatus of claim 1, wherein the apparatus is further caused to refine the combined identified features from the first sensor data and the second sensor data using a maximum likelihood estimator.

6. The apparatus of claim 5, wherein missing data from the combined identified features from the first sensor data and the second sensor data is replaced with data interpreted in context of the first sensor data and the second sensor data.

7. The apparatus of claim 5, wherein the maximum likelihood estimator determines a location of the combined identified features.

8. A computer program product comprising at least one non-transitory computer-readable storage medium having computer-executable program code portions stored therein, the computer-executable program code portions comprising program code instructions configured to:
   receive first sensor data from a first vehicle having traversed a first path along a first lane of a first road segment;
   identify features from the first sensor data of the first road segment, wherein a confidence of the first sensor data is inversely proportional to a distance from the first path;
   receive second sensor data from a second vehicle having traversed a second path along a second lane of the first road segment;
   identify features from the second sensor data of the first road segment, wherein a confidence of the second sensor data is inversely proportional to a distance from the second path;
   align the identified features from the second sensor data of the first road segment with the identified features from the first sensor data of the first road segment;
   combine the identified features from the first sensor data and the second sensor data based, at least in part, on the confidence of the respective sensor data; and
   generate a map of the road segment based on the combined identified features.

9. The computer program product of claim 8, further comprising program code instructions to:
   facilitate autonomous vehicle control along the road segment based, at least in part, on the generated map of the road segment.

10. The computer program product of claim 8, wherein the features of the first sensor data are classified into at least one of a plurality of attribution categories, wherein the features of the second sensor data are classified into at least one of the plurality of attribution categories, wherein the program code instructions to align the identified features from the second sensor data with the identified features from the first sensor data comprise program code instructions to:
align identified features of the second sensor data of a first attribution category with identified features of the first sensor data of the first attribution category.

11. The computer program product of claim 8, wherein the confidence of the first sensor data is further defined by one or more properties of a sensor producing the first sensor data.

12. The computer program product of claim 8, further comprising program code instructions to refine the combined identified features from the first sensor data and the second sensor data using a maximum likelihood estimator.

13. The computer program product of claim 12, wherein missing data from the combined identified features from the first sensor data and the second sensor data is replaced with data interpreted in context of the first sensor data and the second sensor data.

14. The computer program product of claim 12, wherein the maximum likelihood estimator determines a location of the combined identified features.

15. A method comprising:
receiving first sensor data from a first vehicle having traversed a first path along a first lane of a first road segment;
identifying features from the first sensor data of the first road segment, wherein a confidence of the first sensor data is inversely proportional to a distance from the first path;
receiving second sensor data from a second vehicle having traversed a second path along a second lane of the first road segment;
identifying features from the second sensor data of the first road segment, wherein a confidence of the second sensor data is inversely proportional to a distance from the second path;
aligning the identified features from the second sensor data of the first road segment with the identified features from the first sensor data of the first road segment;
combining the identified features from the first sensor data and the second sensor data based, at least in part, on the confidence of the respective sensor data; and
generating a map of the road segment based on the combined identified features.

16. The method of claim 15, further comprising:
facilitating autonomous vehicle control along the road segment based, at least in part, on the generated map of the road segment.

17. The method of claim 15, wherein the features of the first sensor data are classified into at least one of a plurality of attribution categories, wherein the features of the second sensor data are classified into at least one of the plurality of attribution categories, wherein aligning the identified features from the second sensor data with the identified features from the first sensor data comprises:
aligning identified features of the second sensor data of a first attribution category with identified features of the first sensor data of the first attribution category.

18. The method of claim 15, wherein the confidence of the first sensor data is further defined by one or more properties of a sensor producing the first sensor data.

19. The method of claim 15, further comprising refining the combined identified features from the first sensor data and the second sensor data using a maximum likelihood estimator.

20. The method of claim 19, wherein the maximum likelihood estimator determines a location of the combined identified features.

* * * * *